C. LAING.
PHOTOMETER.
APPLICATION FILED JAN. 10, 1916.
1,218,946.
Patented Mar. 13, 1917.
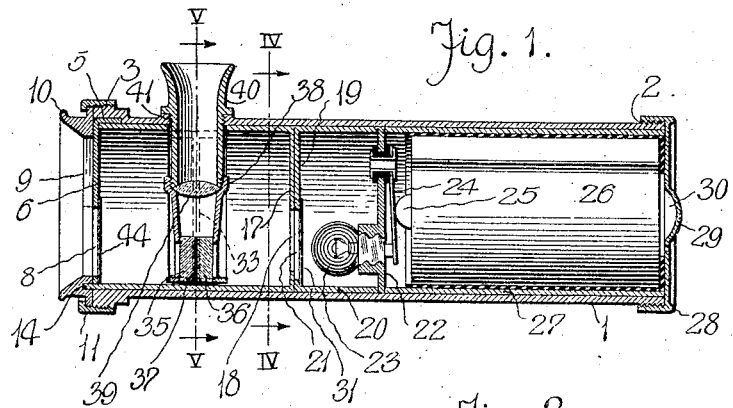
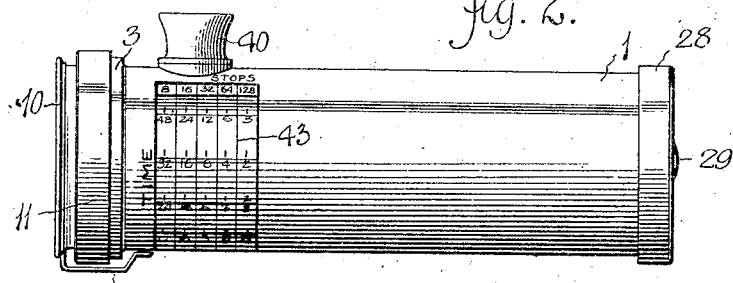
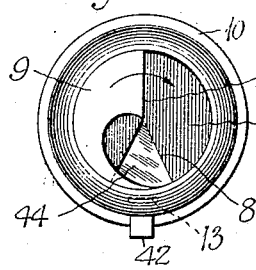 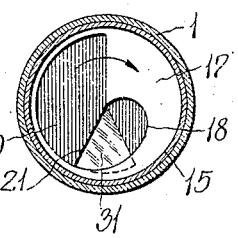 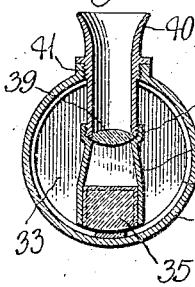 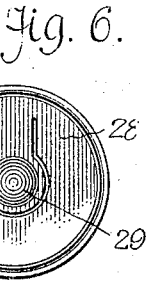
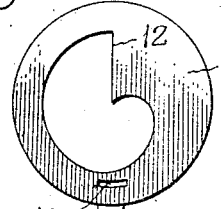 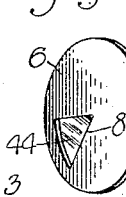 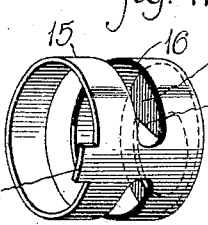 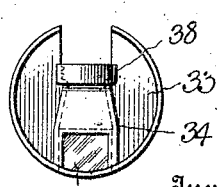
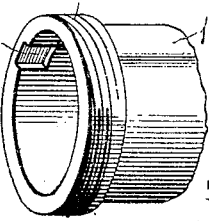 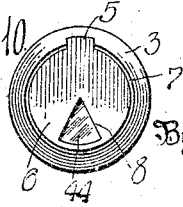
Witnesses
Karl H. Butler
Chas. W. Stauffer
Inventor
Clayton Laing,
By
Attorneys

UNITED STATES PATENT OFFICE.

CLAYTON LAING, OF CHICAGO, ILLINOIS.

PHOTOMETER.

1,218,946.   Specification of Letters Patent.   Patented Mar. 13, 1917.

Application filed January 10, 1916. Serial No. 71,187.

*To all whom it may concern:*

Be it known that I, CLAYTON LAING, a subject of the King of England, residing at Chicago, in the county of Cook and State of Illinois, have invented certain new and useful Improvements in Photometers, of which the following is a specification, reference being had therein to the accompanying drawings.

In the art of photography, the subject of time exposure is an uncertainty. This invention relates to a photometer embodying a constant or standard light and novel means for balancing or equalizing varied amounts of outside light with varied amounts of the standard light within the instrument, through a range of the intensity of lights from the lowest practical for photographic exposures to the brightest sunlight, to indicate in conjunction with previously determined calculation, the different periods of time required for exposures, for each of the several stops of a camera shutter.

A photometer in accordance with my invention embodies a standard light adapted for comparison with an outside light or sunlight, a comparator by which the intensity of two light rays may be compared, and novel coöperating shutters by which the intensity of the actinic effect of the light rays may be measured to determine the proper duration of exposure for a sensitized photographic film or plate.

The comparator of the instrument includes two translucent members or blocks separated by an opaque screen or partition, and provision is made for facilitating close observation of said blocks. When equal amounts of light penetrate the blocks they appear as one block, the two halves of the block perfectly balancing or showing that the light rays are of equal intensity. The standard or constant light of the instrument is preferably in the form of an incandescent lamp. Ordinarily an electric light, when compared with sunlight, has an excess of rays from the red end of the spectrum that makes it impossible to be properly balanced with sunlight, but in this instrument such inequality is eliminated by absorbing the excess red rays by means of a properly colored screen in front of the electric light.

The coöperating shutters of the instrument are of novel design and permit of a standard or known light and an unknown light being regulated in synchronism, until the actinical rays of the light harmonize or balance. By closing on the unknown for lights of greater intensity than that from the standard and closing on the standard light for those of less intensity than that from the standard, a maximum illumination is obtained at the comparator, and this is accomplished by a single movement of the shutters. The difficulty in photometry for photographic purpose is the great range of intensity of light to be measured; exposures ranging in time from hundredths of a second to several minutes, which range an instrument must cover to be of value. The principle of cutting down an unknown light to balance with a standard light does not cover such range, because the standard light must be just strong enough to balance with the darkest unknown light practicable for photographic work. This is so weak that it is impossible to balance strong sunlight against it no matter how it is stepped down. The eye looking from the bright sunlight could not perceive it, let alone balance it. Cutting down on the standard light to balance with the outside light has the reverse disadvantage. The standard light being so much weaker than the bright sunlight, it is necessary to set the comparator much farther from the unknown light in order to balance the sunlight, in which instance, the lights of weaker intensities are invisible; or, by placing the comparator close enough to the unknown light in order to measure the weaker lights, the standard is not strong enough to balance sunlight.

The above difficulties in photometry have been obviated in my instrument by coöperating shutters which alone cause the intensities of light rays to vary directly as the movement of the operating medium of the shutter, and with proper calibrations of the instrument, it is possible to accurately determine time exposure for a photographic film or plate, consequently the several stops of a camera can be intelligently used in connection with my instrument to obtain a high degree of efficiency in this branch of photography.

Reference will now be had to the drawing, wherein—

Figure 1 is a longitudinal sectional view of an instrument embodying features of my invention;

Fig. 2 is a side elevation of the same;

Fig. 3 is a view of the outer end of the instrument;

Fig. 4 is a cross sectional view taken on the line IV—IV of Fig. 1;

Fig. 5 is a similar view taken on the line V—V of Fig. 1;

Fig. 6 is a view of the inner end of the instrument;

Fig. 7 is an elevation of an outer rotary shutter;

Fig. 8 is a perspective view of a detached stationary outer shutter;

Fig. 9 is a perspective view of the outer end of the instrument casing adapted to receive the stationary outer shutters;

Fig. 10 is a view of the outer end of the instrument casing, showing the stationary outer shutter in position;

Fig. 11 is a perspective view of a rotary shutter member; and

Fig. 12 is an elevation of a detached comparator holder.

In describing my invention by aid of the views above referred to, I desire to point out that the same are merely intended as illustrative of an example by which my invention is applied in practice, and I do not care to limit myself to the precise construction and arrangement of parts shown. The following description is therefore to be broadly construed as including substitute constructions and arrangement of parts which are the obvious equivalent of those hereinafter referred to.

In the drawings, 1 denotes a tubular casing having the inner end thereof exteriorly screwthreaded, as at 2. The outer end of the tubular casing 1 has an exteriorly screwthreaded collar 3 and the bore of said collar is provided with a recess 4 as best shown in Fig. 9, to receive the tongue 5 of an outer stationary circular shutter 6 of less diameter than the bore of the collar 3, thereby providing a space or slot 7 between the collar and shutter, when the latter is mounted in the former, as shown in Fig. 10. The outer stationary shutter 6 has a sector shaped opening 8 of about 60 degrees radiating from the center of the shutter. The position of the opening 8 relative to the shutter or casing 1 is in proximity to what may conveniently be termed the bottom side of said casing.

Holding the outer stationary shutter 6 in engagement with the collar 3 is an adjustable rotary shutter 9 provided with an annular finger piece 10. The shutter 9 is held in parallelism with the shutter 6 by a retaining ring 11 screwed on the collar 3, and by removing said retaining ring and the shutters 6 and 9 easy access can be had to the interior of the casing 1. The shutter 9, as best shown in Fig. 3, has an opening 12 and the greater part of this opening includes 150 degree sector area of the shutter, with one end wall of the opening radiating from the center of the shutter and the other end wall in the form of an involute curve starting at the center of the shutter and merging into the curved wall of the opening.

The adjustable rotary shutter 9 has a recess 13 contiguous to the periphery thereof and in communication with the slot 7 to receive a tongue 14 on the outer end of a cylindrical shutter connecting member 15 rotatable in the casing 1. The shutter connecting member 15, as best shown in Fig. 11, has a circumferential slot 16 providing clearance for a comparator to be hereinafter described, and the inner end of the member 15 terminates in a shutter 17 having an opening 18 of similar shape to the opening 12 of the outer rotary shutter 9, but reversely disposed, as is apparent by comparing Figs. 3 and 4. The outer end of the connecting member 13, being interlocked with the outer rotary shutter causes the shutters 9 and 17 to move in synchronism when the finger piece 10 is rotated relative to the casing 1, and the disposal of the openings 12 and 18 is very essential as will hereinafter appear.

The shutter 17 abuts and is in parallelism with a stationary inner shutter 19 carried by a sleeve 20 mounted in the casing 1. The shutter 19 has a sector opening 21 corresponding in size and shape to the opening 8 of the shutter 6 and the two openings longitudinally aline.

Engaging the end of the sleeve 20 is a lamp holder 22 for an incandescent lamp 23, constituting a stationary or constant light. The holder 22 has contact means 24 for the terminal 25 of a suitable source of electrical energy, as a battery 26 mounted in a container 27 of insulation placed in the inner end of the casing 1. The battery and its container are retained within the casing 1 by a closure 28 screwed or otherwise detachably mounted upon the inner end of said casing, and said closure has a resilient contact 29 for another terminal 30 of the battery. The resilient contact 29 constitutes a convenient switch by which an electrical circuit may be established through the casing 1 and the lamp holder 22 to the lamp 23 thereof, thus permitting of the lamp 23 being maintained as a light for a desired period of time.

Owing to the fact that the electric lamp 23, when illuminated, gives a larger percentage of red rays than is present in sunlight it is impossible to properly balance the lamp rays against sunlight. A proper balance however, is obtained in this instrument by absorbing the excess intensity or energy in the red end of the spectrum from the lamp by means of a suitably colored screen 31 placed over the opening 21 of the stationary inner shutter 19. In some instances the bulb of the incandescent lamp 23 may be suitably colored, or this phase of the matter attended to by a translucent colored block of the comparator.

To exclude dirt, dust and other foreign matter and at the same time diffuse rays of an unknown or outside light, a screen or plate 44, similar to the screen 31, is placed over the opening 8 of the outer stationary shutter 6, as best shown in Fig. I. These screens are very essential from a spectrum standpoint in order that the intensities of light rays may be properly balanced for observation purposes.

The comparator comprises an opaque flanged disk or partition 33 provided with a holder or cage 34 for blocks or pieces 35 and 36 of translucent material, as paraffin or milky glass. The blocks 35 and 36 are separated by an opaque partition or screen 37, preferably tinfoil, and these blocks are in longitudinal alinement with the openings 8 and 21 of the stationary shutters 6 and 19 respectively. The holder or cage 34 has a socket member 38 for a magnifying lens 39 and the inner end of an eye piece 40, said eye piece being detachably mounted in an opening 41 provided therefor in the casing 1. The lens 39 obviates the necessity of a long eye piece and enlarges the edges of the blocks to the eye. The eye piece extends through the circumferential slot 17 of the shutter connecting member 15 and constitutes a stop to limit the rotary movement of said member. The eye piece has been illustrated as having a funnel shaped outer end, but it is possible to make the outer end of the eye piece flush with the periphery of the casing to avoid any protuberance that might interfere with carrying the instrument.

The periphery of the casing 1, contiguous to the collar 3, is calibrated as at 43 to correspond with similar stops or graduations of the shutter of the camera, and movable relative to said calibrations is a pointer or indicator 42 carried by the finger piece 10 and extending over the retaining ring 11. The first circumferential row of indicia positively determines photographic conditions relative to certain lights, and the remaining indicia is optional for the discretion of the operator.

In operation, the standard or constant light is established, the finger piece 10 adjusted, and the comparator observed. By reason of the shape of the openings of the stationary shutters and the shape and disposal of the openings of the adjustable shutters, the exposure area of the openings 8 and 21 may be independently decreased or increased by adjusting the finger piece 10.

Assuming that the intensity of light rays from the standard or constant light is greater than rays from the darkest outside light practicable for photographic work, and that the day on which a picture is to be taken is dark or cloudy, then the finger piece 10 is rotated clockwise to "open" the shutter 6 and gradually "close" the shutter 19, until the light rays of the two sources of light harmonize or balance in the blocks 35 and 36 of the comparator. With these two blocks appearing as one or harmonizing in shade or color the operator can observe the calibrations or indicia 43 indicated on the casing 1 by the pointer 42 and set the shutter action of a camera in accordance therewith, thus assuring proper photographic exposure in connection with the camera.

Should the day on which a picture is to be taken be of bright sunlight, then the finger piece 10 is rotated counterclockwise, to cut down the daylight and increase the artificial light until the actinical rays perfectly balance.

From the foregoing it will be observed that I have devised a simple, inexpensive and durable instrument that can be made of a size convenient to be carried in a pocket or as an attachment for a camera, and with the battery of that type ordinarily used in connection with a flash light, it can be renewed from time to time and the instrument maintained in operative condition. Should the battery weaken and need renewing, such a condition can be readily detected in the comparator.

What I claim is:—

1. Means for comparing light rays, comprising a comparator adapted to be exposed to natural and artificial lights, and means for simultaneously varying the intensity of rays from said lights to balance the light intensity in said comparator.

2. Means for comparing light rays, comprising a comparator adapted to be simultaneously exposed to natural and artificial lights, and means for varying the intensity of either light until rays from said lights have an equal intensity in said comparator.

3. Means for comparing light rays, comprising a stationary light, a stationary comparator adapted to be simultaneously exposed to said artificial light and to a natural light, and means for varying the intensity of either light until rays from said lights have an equal intensity in said comparator.

4. Means for comparing light rays, comprising a stationary artificial light, a stationary comparator adapted to be exposed to said artificial light and to a natural light, and shutters between said comparator and each light movable in synchronism adapted for balancing the light rays in said comparator.

5. Means for comparing light rays, comprising a stationary artificial light, a comparator adapted to be exposed to said artificial light and to a natural light, a shutter between said comparator and each light, and means adapted to move said shutters to regulate the intensity of the light rays in said comparator.

6. A photometer having a comparator, and shutters at both sides of said comparator operable in synchronism for varying the intensity of light rays admitted to said comparator directly as the adjustment of said shutters.

7. A photometer comprising a comparator, means for admitting light rays of various intensities to said comparator, and a rotary member in the path of light rays at both sides of said comparator adapted for increasing and decreasing the intensity of said light rays until balanced in said comparator.

8. A photometer comprising a casing, a stationary light in an end thereof, a stationary comparator intermediate the ends of said casing adapted to receive light rays from said stationary light and light rays from a natural source, and rotary means in said casing adapted to regulate the intensity of either light rays to balance the rays of light in said comparator.

9. A photometer comprising a casing, a stationary light in an end thereof, a stationary comparator intermediate the ends of said casing adapted to receive light rays from said stationary light and light rays from a natural source, shutters between said comparator and said lights, and means connecting said shutters and operable at an end of said casing adapted to vary the intensity of the rays from said lights at said comparator until said light rays are balanced in said comparator.

10. A photometer comprising a casing, a shutter at one end thereof adapted to admit daylight to said casing, a comparator adjacent said shutter, a source of light detachably mounted in the opposite end of said casing, a shutter in said casing between said comparator and said source of light, and a member connecting said shutters whereby said shutters may be moved in synchronism to balance light rays in said comparator.

11. In a photometer, a comparator exposed to two rays of light, comprising a cage, translucent blocks in said cage adapted to independently reflect rays of light, and means in the path of the rays of light adapted to move in synchronism to regulate the intensity of light rays in said comparator.

12. In a photometer, a comparator exposed to rays of light, comprising a cage, an eye piece in alinement with said cage, reflecting blocks in said cage adapted to reflect rays of light, an opaque partition between said blocks, and means in the path of the rays of light adapted to move in synchronism to regulate the intensities of light rays in said comparator.

13. A method of comparing the intensities of light rays, consisting of simultaneously closing on one source of light and opening on the other source of light until the light rays balance at a point predetermined to one source of light.

In testimony whereof I affix my signature in the presence of a witness.

CLAYTON LAING.

Witness:
JANE ETHEL WHITMAN.